US006521887B1

(12) United States Patent

Funsten et al.

(10) Patent No.: US 6,521,887 B1

(45) Date of Patent: Feb. 18, 2003

(54) TIME-OF-FLIGHT ION MASS SPECTROGRAPH

(75) Inventors: Herbert O. Funsten, Los Alamos, NM (US); David J. McComas, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/310,633

(22) Filed: May 12, 1999

(51) Int. Cl.[7] .......................... H01J 49/00; B01D 59/44

(52) U.S. Cl. ........................ 250/287; 250/289; 250/290

(58) Field of Search ................................ 250/281, 287, 250/290, 289

(56) References Cited

U.S. PATENT DOCUMENTS

| | | | | |
|---|---|---|---|---|
| 3,164,718 A | * | 1/1965 | King | 250/287 |
| 4,458,149 A | * | 6/1984 | Muga | 250/287 |
| 4,912,327 A | * | 3/1990 | Waugh | 250/287 |
| 5,168,158 A | | 12/1992 | McComas et al. | 250/287 |
| 5,396,065 A | | 3/1995 | Myerholtz | 250/287 |
| 5,420,423 A | * | 5/1995 | Linden | 250/281 |
| 5,614,711 A | * | 3/1997 | Li et al. | 250/282 |
| 5,726,448 A | * | 3/1998 | Smith et al. | 290/270 |
| 5,872,356 A | * | 2/1999 | Fischer et al. | 250/281 |
| 5,696,375 A | * | 12/1999 | Park et al. | 250/287 |

OTHER PUBLICATIONS

A beam–modulated time–of–flight mass spectrometer Part II: experimental work, authored by JM Bakker, Sci.Instr. 7, pgs. 364–368 (1974).*

"A beam–modulated time–of–flight mass spectrometer Part I: theoretical considerations", authored JM Bakker., J. Phys. E; Sci. Instr. 6, pgs. 785–789 (1973).*

A. O. Nier, Rev. Sci. Instr. 18, 398 (1947).

L. Holmlid, Intl. J. Mass Spectrom. and Ion Phys. 17, (1975).

J. Mattauch et al., Zeitschrift fur Physik 89, 786 (1934).

Quadrupole Mass Spectrometry and its Applications, ed. Peter H. Dawson (American Institute of Physics, New York, 1995) pp. 9–152.

M. Guilhaus, "Principles and Instrumentation in Time–of––flight Mass Spectrometry," J. Mass Spectrom. 30, 1519 (1995).

J. R. D. Copley, Nucl. Instr. and Meth. in Phys. Res. A291, 519 (1990).

G. Wilhelmi et al., Nucl. Instr. and Meth. in Phys. Res. 81, 36 (1970).

H. Wollnik, "Time–of–flight Mass Analyzers," Mass Spectrom. Rev. 12, 89 (1993).

D. J. McComas et al., "New Approach to 3–D, High Sensitivity, High Mass Resolution Space Plasma Composition Measurements," Rev. Sci. Instrum. 61, 3095 (1990).

* cited by examiner

*Primary Examiner*—Jack Berman
*Assistant Examiner*—K. Fernandez
(74) *Attorney, Agent, or Firm*—Samuel M. Freund; Milton D. Wyrick

(57) ABSTRACT

An ungated, time-of-flight ion mass spectrograph utilizing a continuous ion beam that is rastered (swept) by electrostatic deflection plates at the entrance of a time-of-flight drift tube is described. After an ion is deflected, it follows a trajectory in the drift tube that depends on the phase of the raster and is detected by a position-sensitive detector. The detected position provides information concerning the time when the ion entered the drift tube. This information, when combined with knowledge of the raster voltage at the time that the ion was detected, provides a method for determining the time-of-flight of the ion in the drift tube. Using the time-of-flight and the distance traveled in the drift tube, which is also determined by the detected position of the ion, ion speed is determined. Ion mass-per-charge ratio can then be determined for a monoenergetic ion beam. When electrostatic rastering is performed in a direction that is orthogonal to deflection with a constant electric field, the ion speed, energy-per-charge ratio, and mass-per-charge ratio can be determined. The present ungated time-of-flight apparatus permits high duty cycle and therefore, rapid acquisition of mass spectra.

12 Claims, 4 Drawing Sheets

PRIOR ART

TIME-OF-FLIGHT ION MASS SPECTROGRAPH

FIELD OF THE INVENTION

The present invention relates generally to mass spectrometry and, more particularly, to an apparatus that utilizes the detected position and detected time-of-flight of an electrostatically rastered ion beam to determine the speed and energy-per-charge ratio of individual ions from which the mass-per-charge ratio thereof can be derived. This invention was made with government support under Contract No. W-7405-ENG-36 awarded by the U.S. Department of Energy to The Regents of the University of California. The government has certain rights in the invention.

BACKGROUND OF THE INVENTION

Mass spectrometers are used to measure and analyze the chemical composition of substances. In general, they comprise an ion source, where neutral atoms or molecules from a solid, liquid, or gaseous sample are ionized, a mass analyzer where the atoms or molecules are separated according to their respective masses or their mass-per-charge ratios, and a detector. Various types of mass spectrometers exist, such as, for example, magnetic field spectrometers, quadrupole mass spectrometers, and time-of-flight mass spectrometers.

Magnetic sector mass spectrometers use a magnetic field or combined magnetic and electrostatic fields to measure the ion mass-per-charge. In one type of magnetic sector geometry (see, e.g., A. O. Nier, Rev. Sci. Instr. 18, 398 (1947) and L. Holmlid, Intl. J. Mass Spectrom. and Ion Phys. 17, (1975)), only one mass-per-charge species is detected at any time, so the magnetic field strength, and, if present, the electric field strength are varied to obtain a mass spectrum comprising of multiple mass-per-charge species. A major limitation of this type of sector mass spectrometer is the time that is required to scan the entire mass range one mass at a time.

In another type of magnetic sector mass spectrometer, ions are analyzed and focused onto a position-sensitive detector, resulting in the identification of ion mass-per-charge by spatial dispersion (see, e.g., J. Mattauch and R. Herzog, Zeitschrift fur Physik 89, 786 (1934)). While multiple mass-per-charge species can be detected simultaneously, the spatial resolution of the detector typically limits this type of spectrometer to a narrow mass range.

Quadrupole mass spectrometers utilize a mass filter having dynamic electric fields between four parallel electrodes (see, e.g., *Quadrupole Mass Spectrometry and its Applications*, ed. Peter H. Dawson (American Institute of Physics, New York, 1995)). These fields are tailored to allow ions having a single mass-per-charge to pass through the filter at a time. One major limitation of quadrupole mass spectrometers is the time required to scan the entire mass range one mass at a time.

Time-of-flight mass spectrometry (TOFMS) can simultaneously detect ions over a wide mass range (see, e.g., M. Guilhaus, J. Mass Spectrom. 30, 1519 (1995)). Mass spectra are derived by measuring the times for ions to traverse a known distance. Generally, an ion's mass is derived in TOFMS by measurement or knowledge of an ion's energy E, measurement of the time $t_1$ that an ion passes a fixed point in space $P_1$, and measurement of the later time $t_2$ that the ion passes a second point $P_2$ in space is located a distance d from $P_1$. Using an ion beam having known energy-per-charge E/q, the time-of-flight (TOF) of the ion is equal to $t_2-t_1$, and the ion speed is $v=d/(t_2-t_1)$. Since $E=0.5\ mv^2$, the ion mass-per-charge m/q is represented by the following equation:

$$\frac{m}{q}=\frac{2E(t_2-t_1)^2}{qd^2}. \tag{1}$$

Implementation of a typical time-of-flight mass spectrometer known in the art is shown in FIG. 1 hereof. A monoenergetic ion bunch, 10, is introduced into a drift region, 12, at time $t_1$, and the time for ions from the front of the bunch to the back of the bunch to pass through the entrance aperture, 14, is $\Delta t_1$. The entire path the ions traverse is evacuated (not shown in FIG. 1). Several types of gating exist to introduce an ion bunch with a small $\Delta t_1$. For example, a pulsed, charged grid may be placed in front of aperture 14 to gate the ions entering drift region 12, a pulsed laser can be utilized to generate bunches of ions, or an ion beam can be periodically deflected onto the entrance aperture using an electric field generated between two conducting plates, 16, as shown in FIG. 1. The ions traverse drift region 12 and disperse in space according to their speed and, therefore, mass, and impinge upon detector, 18: the fastest, lightest ions are detected first, and the slower, heavier ions strike at a later time according to Equ. 1.

Conventional time-of-flight mass spectrometry has several major limitations.

First, the time during which the ion bunch transits the entrance aperture introduces an error, $\Delta t_1$, in the mass-per-charge measurement; therefore, $\Delta t_1$ must be made short compared to the time-of-flight of the ions across the drift tube. Additionally, the lightest ions from a new bunch of ions can be admitted into the drift tube generally only after the heaviest ions from the preceding ion bunch are detected. While sophisticated techniques have been developed to overcome the limitation of overlapped spectra (see, e.g., U.S. Pat. No. 5,396,065 for "Sequencing Ion Packets For Ion Time-Of-Flight Mass Spectrometry" which issued to C. A. Myerholtz, et al. on Mar. 07, 1995, J. R. D. Copley, Nucl. Instr. and Meth. in Phys. Res. A291, 519 (1990), and G. Wilhelmi et al., Nucl. Instr. and Meth. in Phys. Res. 81, 36 (1970)), conventional time-of-flight mass spectrometers are inefficient since the duty cycle, which can be defined as the fraction of time that ions can enter the drift tube for analysis, is generally much less than unity. Second, it may be observed from Equ. 1 that the mass-per-charge ratio measurement is dependent on the distance d that the ion has traveled over the drift time $t_2-t_1$. Therefore, any errors in this time difference will produce corresponding errors in the derived mass-per-charge ratio. These errors are typically minimized by employing a long drift tube and a detector with a small detection area so that d is accurately known.

More recently, a non-time-of-flight technique has been used to determine the mass and velocity of ions. In U.S. Pat. No. 5,726,448 for "Rotating Field Mass and Velocity Analyzer" which issued to Steven Joel Smith and Ara Chutjian on Mar. 10, 1998, a rotating field mass and velocity analyzer having a cell with four walls, time dependent RF potentials applied to each of the walls and a detector is described. The time-dependent RF potentials create an RF field in the cell which effectively rotates within the cell. An ion beam accelerated into the cell is dispersed by the RF field according to the mass-to-charge ratio and velocity distribution of the ion beam. The ions of the beam either collide with the ion detector or deflect away therefrom depending on the mass-to-charge ratio, the RF amplitude, and the RF frequency. The detector counts the incident ions to determine the mass-to-charge ratio and the velocity distribution in the ion beam. Thus, ions that traverse a dynamic, (time-varying) electric field follow trajectories that are dependent on mass. Since the detector is located close to the cell (no time-of-flight tube), the resolution of the apparatus is limited by the time-of-flight of the ions.

Accordingly, it is an object of the present invention to provide an apparatus having a duty cycle of approximately unity for quantitatively measuring the speed, energy-per-charge, and mass-per-charge of ions.

Another object of the invention is to provide an apparatus for quantitatively measuring the speed, energy-per-charge, and mass-per-charge of ions where the deflected trajectory of an individual ion is independent of its mass.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for measuring the mass-per-charge of individual ions in a beam of ions hereof may include: means for generating a collimated, continuous beam of ions travelling along a chosen axis; electrostatic deflection means disposed about the chosen axis such that the beam of ions passes unobstructed therethrough; a voltage source for establishing a chosen pattern of time-varying voltages onto the electrostatic deflection means; and a position-sensitive detector for detecting both the position and time of arrival of ions in the beam of ions having individual masses, said detector being disposed along the axis at a distance such that the beam of ions takes a long time to traverse the distance between the second electrostatic deflection electrodes and the position-sensitive detector when compared with the time the beam of ions takes to traverse both sets of the electrostatic deflection electrodes, whereby the detected position of each of the ions in the group of ions provides information from which the ion mass-per-charge is determined.

Preferably, the means for electrostatic deflection includes pairs of parallel planar electrodes disposed symmetrically about the axis and such that the plane of adjacent planar electrodes are substantially perpendicular.

It is also preferred that the first voltage source generates a first continuous sine wave and the second voltage source generates a second continuous sine wave, whereby the phase of the first sine wave and the phase of the second sine wave are 90° out of phase.

In another aspect of the present invention, in accordance with its objects and purposes, the method for determining the mass-per-charge of an ion hereof may include the steps of: generating a collimated, continuous beam of ions travelling along a chosen axis; electrostatically deflecting the ion beam from the chosen axis using a chosen pattern of time-varying voltages; permitting the deflected ions to drift in a zero electrostatic field drift region for a chosen period; and detecting both the position and time of arrival of ions in the beam of ions having individual masses using a position-sensitive detector, wherein the detector is disposed along the axis at a distance such that the drift period of the beam of ions is long when compared with the time the beam of ions spend during the electrostatically deflecting step, whereby the detected position of each of the ions in the group of ions provides information from which the ion mass-per-charge ratio is determined.

Preferably, the step of electrostatically deflecting the ion beam from the chosen axis using a chosen pattern of time-varying voltages is accomplished using a first pair of parallel planar electrodes and a second pair of parallel planar electrodes disposed such that the plane of the first pair of planar electrodes and the plane of the second pair of planar electrodes are substantially perpendicular, a first voltage source for establishing a chosen pattern of time-varying voltages onto the first pair of planar electrodes, and a second voltage source for establishing a chosen pattern of time-varying voltages onto the second pair of planar electrodes.

It is also preferred that the first voltage source generates a first continuous sine wave and the second voltage source generates a second continuous sine wave, whereby the phase of the first sine wave and the phase of the second sine wave are 90° out of phase.

Benefits and advantages of the present invention include the ability to reliably acquire and analyze mass spectra with high sensitivity, high accuracy, and high speed (high duty cycle, since ions continuously traverse the present apparatus), without the necessity of ion gating, over a broad range of ion masses. Ion energy can also be determined.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings:

FIG. 3*a* is a schematic representation of a linear scan raster for a non-gated time-of-flight ion mass spectrograph having a monoenergetic ion beam, while FIG. 3*b* is a schematic representation of a circular scan for a non-monoenergetic ion beam.

DETAILED DESCRIPTION

Briefly, the present invention includes a spectrograph and method for detecting and measuring the speed and energy-per-charge ratio of an ion from which the mass-per-charge ratio thereof can be derived. Instead of using a gating or pulse scheme to localize the time that ions enter the drift tube as is standard for time-of-flight ion mass spectrometers, the present invention uses no gating scheme, so ions can continuously enter the drift tube. An ungated, continuous ion beam is rastered by electrostatic deflection apparatus at the entrance of an evacuated, time-of-flight drift. The ion trajectory depends on the voltage impressed on the deflection apparatus during the time the ion passes therethrough. The ion's position and time of arrival are detected by a position-sensitive detector. The detected position provides information concerning the voltage of the deflection apparatus at the time when the ion entered the drift tube. This information, when combined with knowledge of the time that the ion was detected, provides a method for determining the time-of-flight of the ion in the drift tube. Using the time-of-flight and the distance traveled in the drift tube, which is also determined by the detected position of the ion, ion speed is determined. Ion mass-per-charge can then be determined for an ion beam having known energy-per-charge ratio.

When electrostatic rastering is performed in a direction that is orthogonal to deflection with a constant electric field, the ion speed and energy-per-charge ratio can be determined, and the mass-per-charge ratio thereof can be derived. The present ungated time-of-flight method permits high duty cycle and therefore, rapid acquisition of mass spectra. Ions in a static electric field follow a unique trajectory that is independent of the ion mass. A key aspect of the present invention is that the deflected trajectory of an ion is independent of its mass ratio. Therefore, it is required that the electric field generated by the deflection plates cannot significantly change while the ion resides between the plates. That is, the electric field must appear to be static or nearly static by the ion while the ion's trajectory is being modified by the field.

Figure 1:
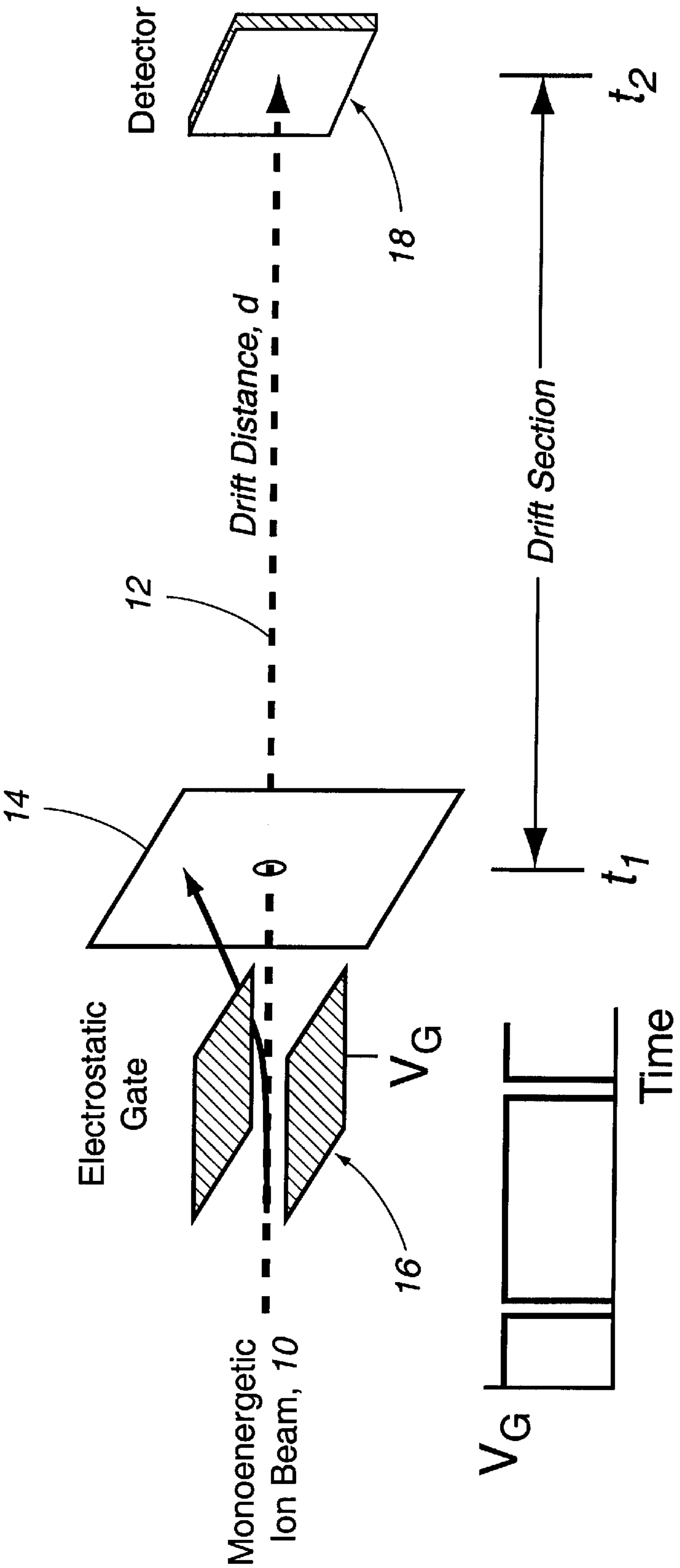
FIG. 1 is a schematic representation of a gated time-of-flight ion mass spectrometer known in the art and labeled Prior Art.
Figure 2:
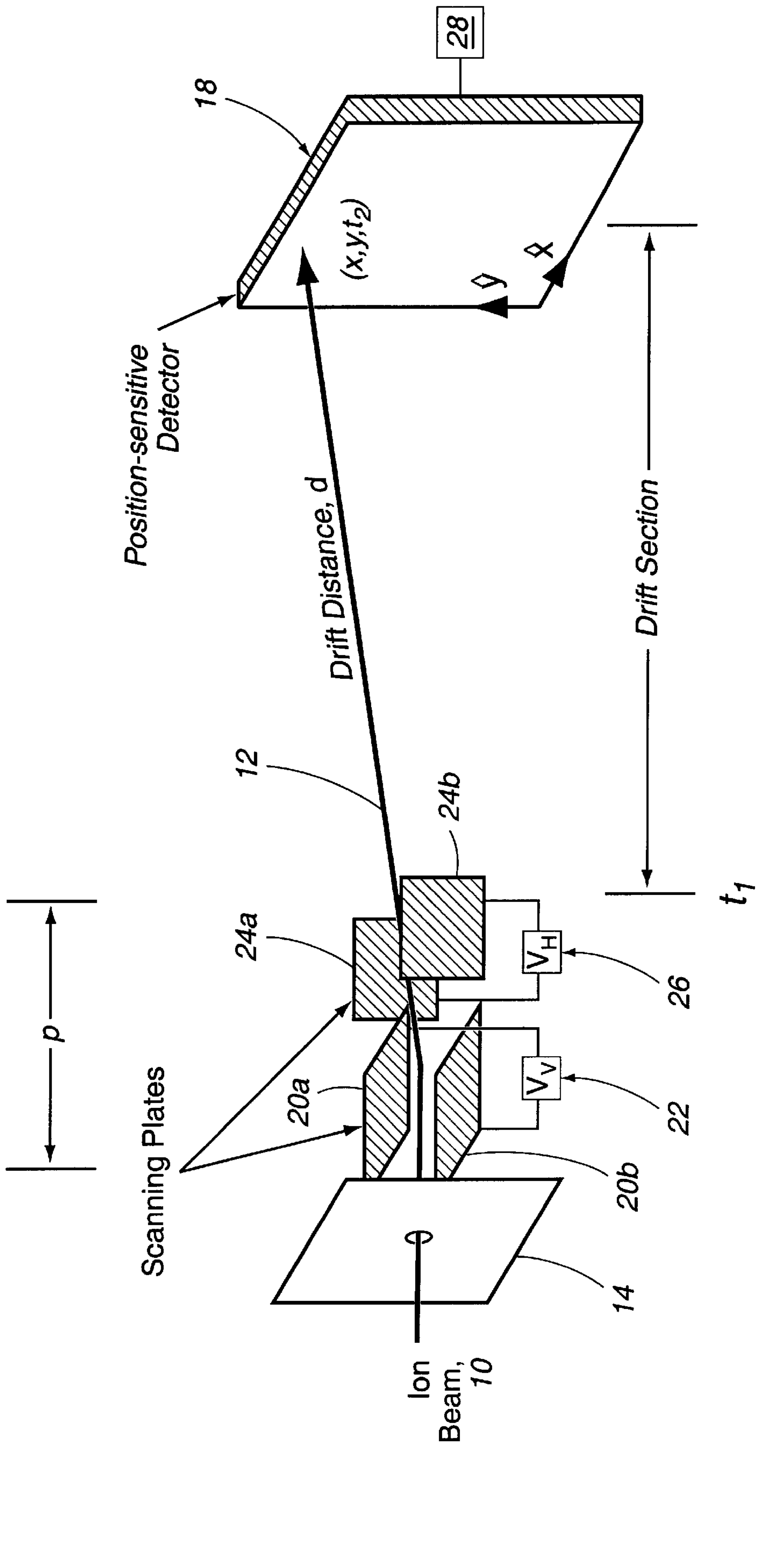
FIG. 2 is a schematic representation of the non-gated time-of-flight ion mass spectrograph of the present invention.

Reference will now be made in detail to the present preferred embodiments of the invention, examples of which are illustrated in the accompanying drawings. Similar or identical structure is identified by identical callouts. Turning now to the Figures, FIG. 2 is a schematic representation of the non-gated time-of-flight ion mass spectrograph of the present invention. Vertical electrostatic deflection (scanning) plates, 20*a* and 20*b*, to which a chosen pattern of time-varying voltages is applied by voltage supply, 22; and horizontal electrostatic deflection plates, 24*a* and 24*b*, to which a chosen pattern of time-varying voltages is applied by voltage supply, 26, are located near the entrance to drift region, 12, raster (sweep) the ion beam over a chosen pattern. More than two sets of conducting plates, say, N sets of conducting plates may be employed. In addition to the dipole configuration shown in FIG. 2, hereof, quadrupole, hexapole, or octapole geometries are useful. Time-varying voltages $V_M(t)$, where the subscript M refers to a particular plate in the set of N plates, are applied to one or more plates from which time-varying electric fields are generated that provide the ions with unique trajectories that depend on the voltages applied to the deflection plates while the ion resides in the deflection system. For example, a periodic pattern similar to the raster pattern of the electron beam in a television (FIG. 3*a*) could be used. If an ion spends a significant fraction of the scan period in the deflection plates, it will follow a helical trajectory that is dependent on mass. If, however, the time that the ion spends in the deflection plate section is small compared to the raster period so that the electric field changes little, then the trajectory of the ion throughout the apparatus is independent of mass, which is a key aspect of the present apparatus. After traversing the drift section, the ions are detected by position-sensitive detector 18, and both the position and time of arrival of the ions are recorded using data processor, 28. As an example, a microchannel plate detector with a position-sensitive anode might be employed as the detector. The entire path of the ions is within an evacuated chamber, not shown in FIG. 2.

The detected position of the ion provides information concerning the ion trajectory and, therefore, $t_1$ and the voltage of the sweep at the time the ion traversed the deflection plates from which the ion mass-per-charge ratio and energy-per-charge ratio can be determined. In summary, the direction that an ion travels after it traverses the deflection plates depends on the voltages applied to the deflection plates at the time, $t_1$, that the ion traversed these plates, and information about $t_1$ is carried in the ion trajectory. That is, the detected position and time that the ion impinges on position-sensitive detector 18 identifies the time $t_1$ that the ion passed through the deflector plates.

Having generally described the invention, the following EXAMPLES will provide additional details thereof.

EXAMPLE 1

Returning to the configuration of the apparatus shown in FIG. 2 hereof, the initial ion beam trajectory defines the central axis of the apparatus. Ions in the ion beam first traverse an aperture that restricts the beam to a known diameter. After traversing the aperture, an ion enters two sets of deflection plates in a dipole geometry with voltages $V_1(t)$ and $V_3(t)$, and $V_2(t)$ and $V_4(t)$ being applied to plates 20*a* and 20*b*, and 24*a* and 24*b*, respectively. All deflection plates are parallel to the trajectory of the incident beam, are placed symmetrically around the central axis, have a length p, and have a separation between opposite plates of s. The distance from the deflection section to the detector equals d. The detector, whose sensitive surface is oriented perpendicular to the central axis of the apparatus, can detect ions and measure the position (x,y) at which the ion strikes the detector. The point (0,0) is defined as the intersection of the central axis of the apparatus and the detector.

Ignoring the fringing fields between adjacent deflection plates and beyond the ends of the deflection plates, the electric field that acts on the ion can be represented by the linear superposition of electric fields. If one defines the electric field vectors $$\varepsilon_X(t) = \frac{V_1(t) - V_3(t)}{s} \tag{2a}$$

and $$\varepsilon_Y(t) = \frac{V_2(t) - V_4(t)}{s}, \tag{2b}$$

the net electric field acting on an ion is given by:

$$\vec{\epsilon}(t) = \epsilon_x(t)\hat{x} + \epsilon_y(t)\hat{y} \tag{3}$$

If an ion transits the deflection plates at time $t_1$, then the detected position of the ion is $$x(t_1) = \frac{q\varepsilon_X(t_1)pd}{2E} \tag{4a}$$

and $$y(t_1) = \frac{q\varepsilon_Y(t_1)pd}{2E}, \tag{4b}$$

where q is the ion charge and E is the ion energy. For simplicity, it is assumed that $p \ll s$.

Generally, q=1 in mass spectrometers, and the energy of the ion beam is monoenergetic and known. The instrument parameters p, d, and s are known. Since voltages $V_1(t)$, $V_2(t)$, $V_3(t)$, and $V_4(t)$ and their variation with time are known, $\epsilon_x(t)$ and $\epsilon_y(t)$ are likewise known. Therefore, from the detected position $(x(t_1),y(t_1))$ of the ion, the time $t_1$ that the ion traversed the deflection plates is uniquely determined. The time difference between $t_1$ and measured time $t_2$ that the ion strikes the detector equals the time-of-flight of the ion in the drift section. Since the position of the ion is measured, its trajectory (and therefore distance of travel d) in the drift section is accurately known. Using the time difference $t_2-t_1$, distance of travel d, and ion energy E, the ion mass m is determined using Equation 1.

In one embodiment of the present invention, the energy-per-charge E/q of an ion can be measured in addition to the ion mass. If the ion beam is rastered in a two dimensional coordinate system in which the electric field varies in time in one vector direction and the electric field is static along the other vector direction; that is, $V_1(t)=V_0 \cos(t/\tau)$, $V_2(t)=V_0 \sin(t/\tau)$, $V_3(t)=-V_1(t)$, and $V_4(t)=-V_2(t)$, where $\tau$ is the raster period and $V_0$ is the maximum voltage applied to any plate (See, FIG. 3*b*, hereof), the resulting deflection at the detector is given by:

$$x(t_1)=\frac{qV_0\cos(t_1/\tau)pd}{Es} \tag{5a}$$

and $$y(t_1)=\frac{qV_0\sin(t_1/\tau)pd}{Es}. \tag{5b}$$

By converting from a Cartesian coordinate system (x,y) to a polar coordinate system (r, θ) using $r^2=x^2+y^2$ and $\theta=\tan^{-1}(y/x)$, the deflection is given by:

$$r=\frac{qV_0pd}{Es} \tag{6a}$$

and the phase $\theta(t_1)$ is given by:

$$\theta(t_1)=t_1/\tau \tag{6b}$$

The energy-per-charge ratio, E/q, is determined from measurement of the radial magnitude, r according to Equation 6a. The time ti that the ion transits the deflection plates is determined from measurement of $0(t_1)$ according to Equation 6b. By measuring the time $t_2$ that the ion struck the detector, mass-per-charge ratio, m/q, is determined using Equation 1.

A requirement of the invention is that the detected position of an ion is clearly associated with a time relative to the time $t_2$ that the ion was detected. In one implementation, the invention would use a timing clock that is reset and started at some point in the raster period, say, at t=0. At some later time, $t_1$, in the raster cycle, an ion passes through the deflection plates and is deflected to a position $(x_0,y_0)$. At a later time, $t_2$, the ion strikes the detector at the position $(x_0,y_0)$ and stops the timing clock at time, $t_2$From the detected position $(x_0,y_0)$, $t_1$ is known relative to the start of the raster cycle at time t=0. Since all times have been referenced to the start of the raster period, the time of flight, $t_2-t_1$, can be determined.

In another embodiment of the invention, the time difference, $t_2-t_1$, can be derived by measuring the relative phases of the raster cycle during the time when an ion traverses the deflection plates (by measuring the detected position of the ion) and when the ion was detected (by measuring the voltages on the deflection plates). The invention would use a peak-hold circuit that would sample the voltages on the deflection plates at the time $t_2$ that an ion is detected. This would provide a measurement of the phase, or point, in the raster cycle that the ion struck the detector. The detected position provides a measurement of the phase, or point, in the raster cycle that the ion traversed the deflection plates. Assuming that time dependence of the raster pattern is known, then the difference in the two phases, or points, in the raster cycle therefore allows determination of the ion's time-of-flight.

In conventional time-of-flight ion mass spectrometers that use periodic gating, a very slow ion may have a time-of-flight that is longer than the sum of the gating period and the time-of-flight of a fast ion in the sample. That is, a slow ion from one bunch of ions may not strike the detector before a much faster ion from a bunch of ions gated later in time passes the slow ion and strikes the detector. This results in a non-unique time-of-flight measurement. To make this measurement unique, the gating period can be increased until the time-of-flight of a slow ion is less than the sum of the gating period and the time-of-flight of the fastest ion in the sample. This effect is also present in the present invention due to its periodic raster. The time-of-flight of a heavy ion may be longer than the raster period, in which situation, the measured time-of-flight $t_2-t_1$ is not unique. In a solution analogous to conventional gated time-of-flight ion mass spectrometers, this effect can be minimized or removed by increasing the raster period.

Returning to EXAMPLE 1 where rastering in a circle is discussed, the start of the raster cycle at t=0 is defined for a particular setting of voltages on the deflector plates. The raster angle θ=0 is defined at t=0. For example, an ion traversing the raster plates at t=0 would be deflected to a maximum vertical position; that is, a position corresponding to the location of 12:00 on a time clock having hands. The relationship between the time $t_1$ that an ion traversed the deflection plates and the angle $\theta_1$ at which it is detected is:

$$\theta_1=2\pi\left(\frac{t_1}{\tau}+n\right),\quad n=0,1,2,\ \ldots\ , \tag{7}$$

where τ equals the period of the raster. If the time-of-flight $t_2-t_1$ of a heavy ion is longer than the raster period, then the detected angle $\theta_1$ is greater than 2π radians. Equation (7), therefore, contains an integer variable $n\geqq 0$ that accounts for the possibility of an ion having a time-of-flight that is longer than the raster period. Although the solution for a single raster period is not unique, this effect can be reduced or eliminated by increasing the raster period.

For an ion detected at a time $t_2$ and at an angle $\theta^1$, the ion mass is derived using the measurements $t_2$ and $\theta_1$, Equation 7, and Equation 1 as follows:

$$m=\frac{2\tau^2E}{d^2}\left(\frac{t_2}{\tau}-\frac{\theta_1}{2\pi}-n\right)^2, \tag{8}$$

where n=0, 1, 2, . . .

Figure 4:
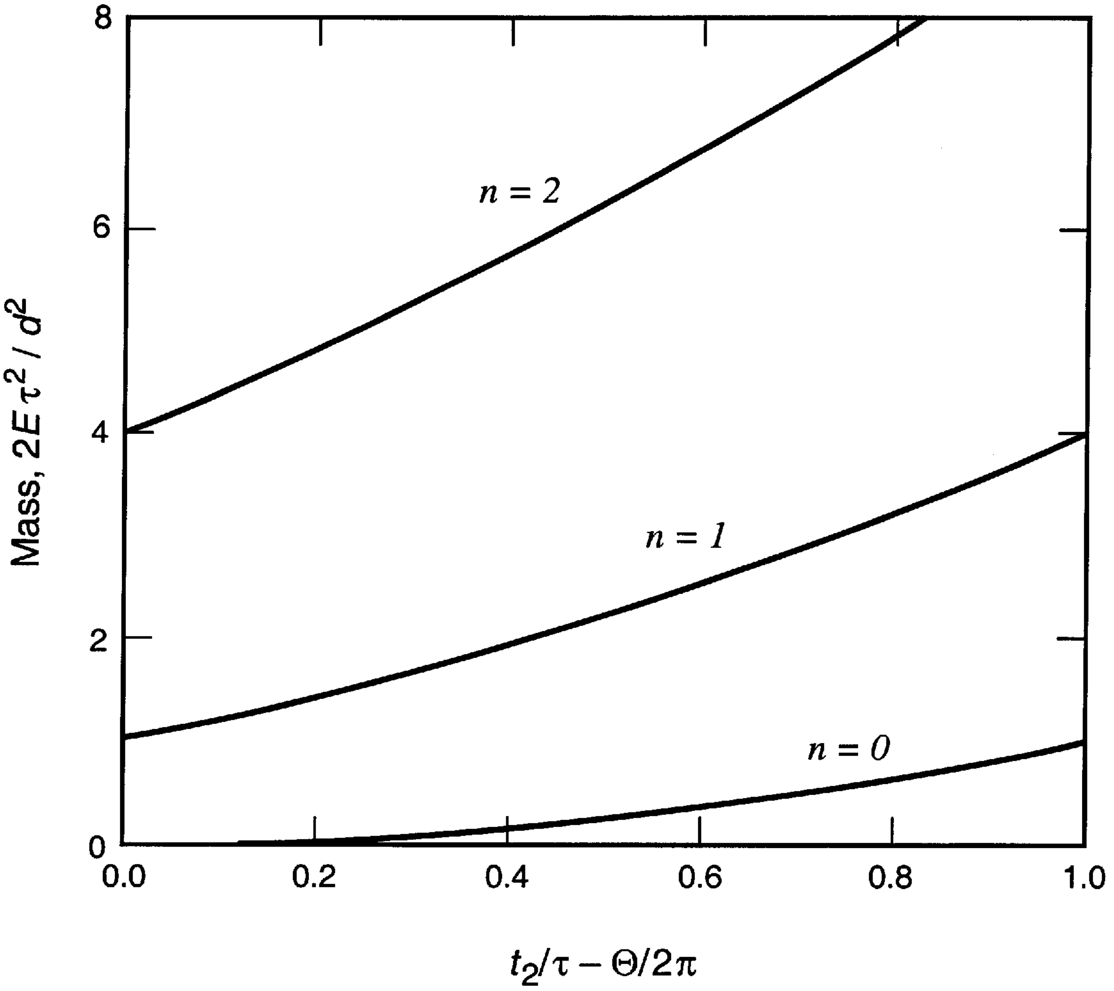
FIG. 4 shows a plot of ion mass in units of $[2E\tau^2/d^2]$ as a function of $[(t_2/\tau)-\theta 2\pi]$ for n equals 0, 1, and 2, where these parameters are defined hereinbelow.

FIG. 4 is a plot of Equation 8 in which the ion mass, in units of $2E\tau^2/d^2$, is shown as a function of $[(t_2/\tau)-\theta/2\pi]$ for n equals 0, 1, and 2. For a single value of $[(t_2/\tau)-\theta/2\pi]$, a different value of mass is obtained for each value of n. This non-uniqueness can be minimized or removed by increasing τ.

EXAMPLE 2

If the incident ion beam is monoenergetic, as in the case of standard-gated time-of-flight mass spectrometry, measurement of the speed provides a unique measurement of the ion mass-per-charge. A periodic raster pattern illustrated in FIG. 3(*a*), which is similar to the raster pattern of the electron beam in a television, could be used.

Figure 3:
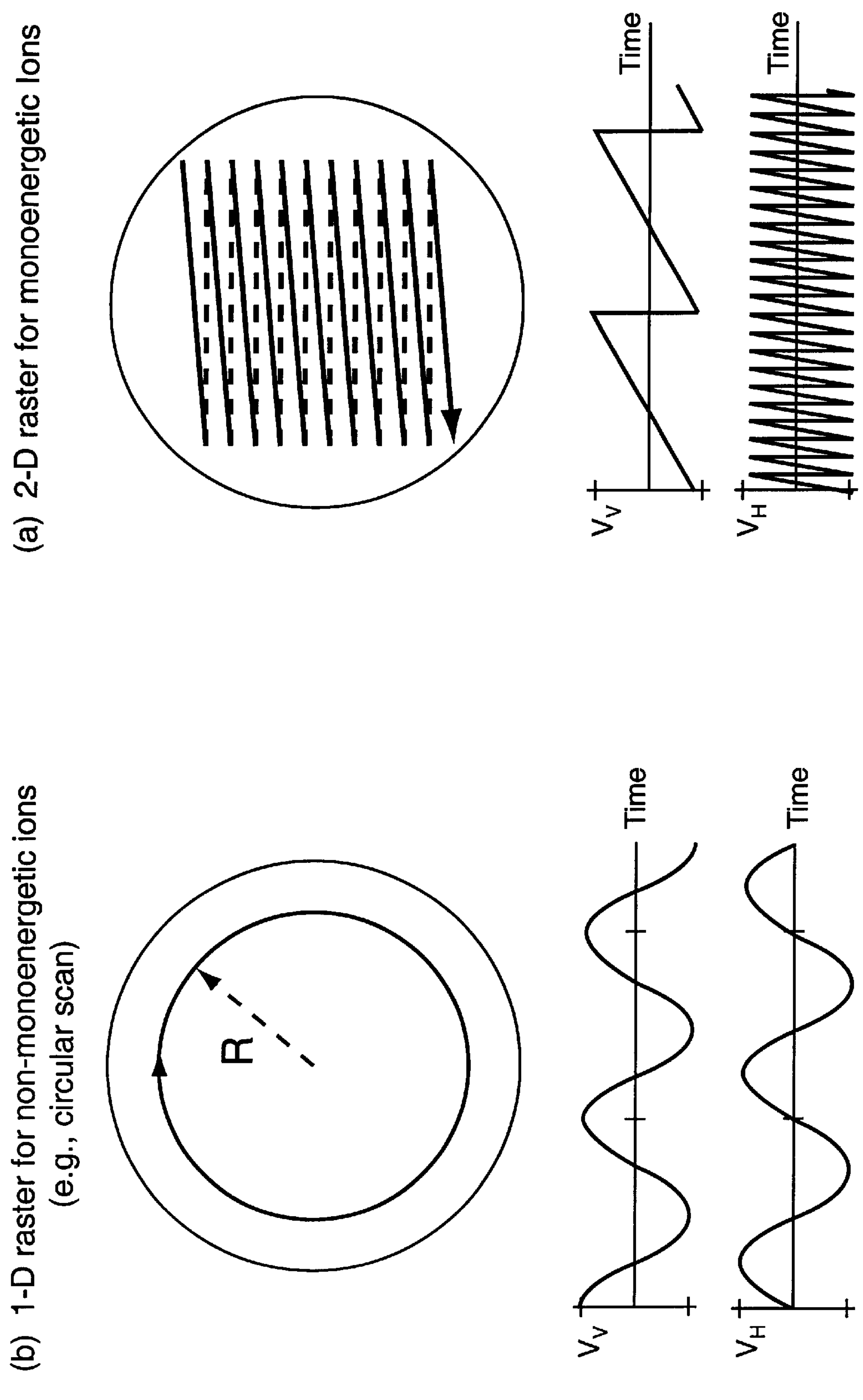

The present invention can also measure energy-per-charge ratio of an ion if the raster direction is orthogonal to an electrostatic deflection that is constant in time. For example, as shown in FIG. 3(*b*) the beam might be rastered in a circular pattern around the axis of the incident ion beam.

For circular rastering in a polar coordinate system, the beam is rastered in the polar direction, and the electric field magnitude in, the radial direction is constant overtime. Therefore, deflection magnitude of ions in the radial direction depends only on the ion energy-per-charge. Therefore, the polar angle of the detected ion determines the start phase, and the detected radial distance from the initial beam axis determines the ion energy-per-charge. The speed measurement (derived from the $\theta_1$, $\theta_2$, and the pathlength of the ion in the drift region) combined with the energy-per-charge measurement provides a mass-per-charge measurement of a non-monoenergetic ion beam.

In a second example, ion mass-per-charge ratio and ion energy-per-charge ratio are derived using a Cartesian coordinate system (x,y) as a basis for the raster. Assuming that the beam axis lies along the z axis of a Cartesian coordinate system, rastering might be performed in the y axis, while the electric field in the x direction is kept constant in time. The time $t_1$ at which an ion traverses the deflection system relative to t=0 is derived from the detected position of the ion according to Equation 4b. Using $t_1$ derived from the y position of the detected ion, the time $t_2$ that that the ion is detected, and the distance d that the ion traveled between the deflection system and the detector, the ion speed is determined.

The mass-per-charge ratio of an ion can then be obtained using the derived speed and knowledge of the energy-per-charge ratio. The beam can be monoenergetic of known energy-per-charge, or the energy-per-charge can be derived by the measurement of the detected position in the x direction of the ion if the electric field in this direction is non-zero and constant in time according to Equation 4a.

In conclusion, the lightest mass ion that can be resolved by the present invention depends on the ability to resolve the time difference $t_2-t_1$, which is determined by the number of spatial pixels on the detector, the raster speed across these pixels, and the ion time-of-flight. The heaviest mass that can be determined generally corresponds to ions having a time-of-flight equal to the raster period. To shift the mass range of the invention, either the raster speed or the time-of-flight must be changed. To shift the mass range to higher masses, the raster speed is changed by decreasing the raster period or the ion time-of-flight is changed by either increasing the ion energy or decreasing the drift tube length. To shift the mass range to lower masses, the raster speed is changed by increasing the raster period or the ion time-of-flight is changed by either decreasing the ion energy or increasing the drift tube length.

One embodiment of the invention utilizes a drift tube that contains a repulsive electric field so that ions entering the drift tube are repelled back toward a detector located at the entrance end of the drift tube (see, e.g., H. Wollnik, Mass Spectrom. Rev. 12, 89 (1993)). This reflection device increases the time-of-flight of ions in a relatively short drift tube. The reflection device could utilize an electric field that varies linearly with distance along the initial ion beam axis, resulting in a time-of-flight that is independent of the ion energy which enables higher mass resolution capabilities since the error in the knowledge of the ion energy does not contribute to the error in the ion mass determination (see, e.g., D. J. McComas and J. E. Nordholt, Rev. Sci. Instrum. 61, 3095 (1990) and U.S. Pat. No. 5,168,158 for "Linear Electric Field Mass Spectrometry" which issued to David J. McComas and Jane E. Nordholt on Dec. 1, 1992).

In other embodiments of the present invention, the mass range may be varied by changing the raster period or the ion energy; the mass range may be varied by changing the ion beam energy; the maximum voltage on the scanning plates can be varied to change the energy range of the ions; and the mass resolution and size of the invention may be reduced using a reflection device in which a the drift tube contains a retarding electric field, so ions are repelled back to a detector located near the entrance end.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for measuring the mass-per-charge ratio of individual ions in a collimated, continuous beam of ions, which comprises in combination:

(a) means for generating a collimated, continuous beam of ions traveling along a chosen axis;

(b) means for electrostatic deflection disposed about the chosen axis such that the collimated, continuous beam of ions passes unobstructed therethrough;

(c) a voltage source for establishing a chosen pattern of time-varying voltages onto said means for electrostatic deflection; and (d) a position-sensitive detector for detecting both the position and time of arrival of the individual ions in the collimated, continuous beam of ions having individual masses, said position-sensitive detector being disposed along the chosen axis at a distance such that the collimated, continuous beam of ions takes a longer time to traverse the distance between said means for electrostatic deflection and said position-sensitive detector when compared with the time the collimated, continuous beam of ions takes to traverse said means for electrostatic deflection, whereby the detected position of each of the individual ions in the collimated, continuous beam of ions provides information from which the ion mass-per-charge ratio is determined.

2. The apparatus as described in claim 1, wherein the ion beam is located in a vacuum during its trajectory through said apparatus.

3. The apparatus as described in claim 1, wherein said position-sensitive detector comprises a microchannel plate detector having a position-sensitive anode.

4. The apparatus as described in claim 1, wherein said means for electrostatic deflection includes dipole, quadrupole and hexapole and octapole electrode configurations.

5. The apparatus as described in claim 4, wherein said dipole electrode configuration comprises a first pair of parallel planar electrodes and a second pair of parallel planar electrodes disposed such that the plane of said first pair of planar electrodes and the plane of said second pair of planar electrodes are substantially perpendicular, a first voltage source for establishing a chosen pattern of time-varying voltages onto said first pair of planar electrodes, and a second voltage source for establishing a chosen pattern of time-varying voltages onto said second pair of planar electrodes.

6. The apparatus as described in claim 5, wherein said first voltage source generates a first continuous sine wave and said second voltage source generates a second continuous sine wave, whereby the phase of the first sine wave and the phase of the second sine wave are 90° out of phase.

7. The apparatus as described in claim 5, further comprising means for rendering the continuous beam of ions monoenergetic and wherein said first voltage source generates a slowly varying sawtooth wave and said second voltage source generates a rapidly varying sawtooth wave.

8. A method for measuring the mass-per-charge of individual ions in a collimated, continuous beam of ions, which comprises the steps of:

(a) generating a collimated, continuous beam of ions traveling along a chosen axis;

(b) electrostatically deflecting the collimated, continuous beam of ions from the chosen axis using a chosen pattern of time-varying voltages;

(c) permitting the deflected collimated, continuous beam of ions to drift in a zero electrostatic field drift region for a chosen period of time; and (d) detecting both the position and time of arrival of the individual ions in the collimated, continuous beam of ions having individual masses using a position-sensitive detector, wherein the position-sensitive detector is disposed along the chosen axis at a distance such that the drift period of time of an individual ion in the collimated, continuous beam of ions is longer when compared with the time an individual ion in the collimated, continuous beam of ions spends during said step of electrostatically defecting the collimated, continuous beam of ions, whereby the detected position of each of the individual ions in the collimated, continuous beam of ions provides information from which the ion mass-per-charge ration is determined.

9. A method for measuring the mass-per-charge ratio of individual ions in a continuous beam of ions, which comprises the steps of:

(a) generating a collimated, continuous beam of ions traveling along a chosen axis;

(b) electrostatically deflecting the ion beam from the chosen axis using a chosen pattern of time-varying voltages;

(c) permitting the deflected ions to drift in a zero electrostatic field drift region for a chosen period; and (d) detecting both the position and time of arrival of ions in the beam of ions having individual masses using a position-sensitive detector, wherein the detector is disposed along the axis at a distance such that the drift period of each ion in the beam of ions is longer when compared with the time each ion in the beam of ions spends during said step of electrostatically deflecting the ion beam, whereby the detected position of each of the ions in the group of ions provides information from which the ion mass-per-charge ratio is determined.

10. The method as described in claim 8, wherein said step of electrostatically deflecting the ion beam from the chosen axis using a chosen pattern of time-varying voltages is accomplished using a first pair of parallel planar electrodes and a second pair of parallel planar electrodes disposed such that the plane of the first pair of planar electrodes and the plane of the second pair of planar electrodes are substantially perpendicular, a first voltage source for establishing a chosen pattern of time-varying voltages onto the first pair of planar electrodes, and a second voltage source for establishing a chosen pattern of time-varying voltages onto the second pair of planar electrodes.

11. The method as described in claim 10, wherein the first voltage source generates a first continuous sine wave and the second voltage source generates a second continuous sine wave, whereby the phase of the first sine wave and the phase of the second sine wave are 90° out of phase.

12. The method as described in claim 10, further comprising the step of rendering the continuous beam of ions monoenergetic and wherein the first voltage source generates a slowly varying sawtooth wave and the second voltage source generates a rapidly varying sawtooth wave.

* * * * *